United States Patent
Angus et al.

(10) Patent No.: US 8,615,384 B2
(45) Date of Patent: Dec. 24, 2013

(54) METHOD AND APPARATUS FOR SIMULATING AIRCRAFT DATA PROCESSING SYSTEMS

(75) Inventors: Ian Gareth Angus, Mercer Island, WA (US); Terry Lee Davis, Issaquah, WA (US); Timothy M. Mitchell, Seattle, WA (US); Leigh Wong Momii, Mercer Island, WA (US); Vincent D. Skahan, Jr., Federal Way, WA (US)

(73) Assignee: The Boeing Company, Chicago, IL (US)

( * ) Notice: Subject to any disclaimer, the term of this patent is extended or adjusted under 35 U.S.C. 154(b) by 1427 days.

(21) Appl. No.: 12/166,789

(22) Filed: Jul. 2, 2008

(65) Prior Publication Data

US 2009/0112569 A1    Apr. 30, 2009

Related U.S. Application Data

(60) Provisional application No. 60/984,131, filed on Oct. 31, 2007.

(51) Int. Cl.
*G06F 9/455* (2006.01)

(52) U.S. Cl.
USPC .............. 703/2; 703/8; 703/26; 700/105

(58) Field of Classification Search
USPC ................. 703/2, 6, 8, 26; 700/105
See application file for complete search history.

(56) References Cited

U.S. PATENT DOCUMENTS

| | | |
|---|---|---|
| 2003/0212908 A1 | 11/2003 | Piesco |
| 2004/0122645 A1 | 6/2004 | Shevenell et al. |
| 2007/0127460 A1 | 6/2007 | Wilber et al. |
| 2007/0183435 A1* | 8/2007 | Kettering et al. ............. 370/401 |
| 2008/0300710 A1* | 12/2008 | Cogswell et al. ............. 700/105 |
| 2008/0301012 A1* | 12/2008 | Cogswell et al. ............... 705/29 |
| 2009/0099824 A1* | 4/2009 | Falash et al. ...................... 703/8 |
| 2009/0112569 A1* | 4/2009 | Angus et al. ..................... 703/22 |
| 2009/0138385 A1* | 5/2009 | Harnish et al. .................. 705/28 |
| 2009/0138518 A1* | 5/2009 | Rodgers et al. ............ 707/104.1 |
| 2009/0138871 A1* | 5/2009 | Kimberly et al. ............. 717/173 |
| 2009/0138872 A1* | 5/2009 | Fuchs et al. .................. 717/173 |
| 2009/0138873 A1* | 5/2009 | Beck et al. .................... 717/173 |
| 2011/0112878 A1* | 5/2011 | Isom et al. ................... 705/7.13 |

OTHER PUBLICATIONS

PCT Search Report for application PCT/US2008/081259 dated Apr. 27, 2011.

* cited by examiner

*Primary Examiner* — Thai Phan
(74) *Attorney, Agent, or Firm* — Yee & Associates, P.C.

(57) ABSTRACT

A method, apparatus, and computer program product for simulating mobile platforms. In one advantageous embodiment, a method is used to performing operations with a virtual aircraft network. A data processing system with the virtual aircraft network is connected to a ground network. The operations are performed with the virtual aircraft network connected to the ground network.

21 Claims, 4 Drawing Sheets

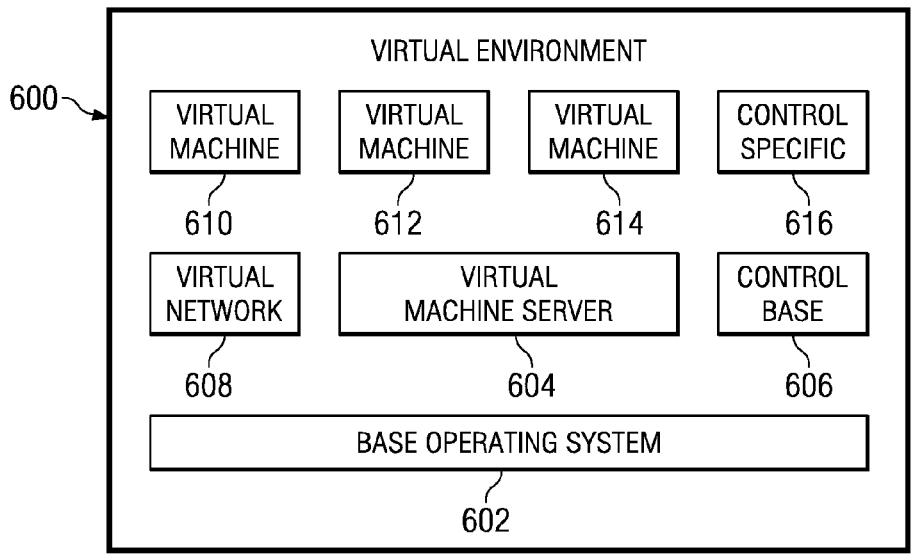
FIG. 6
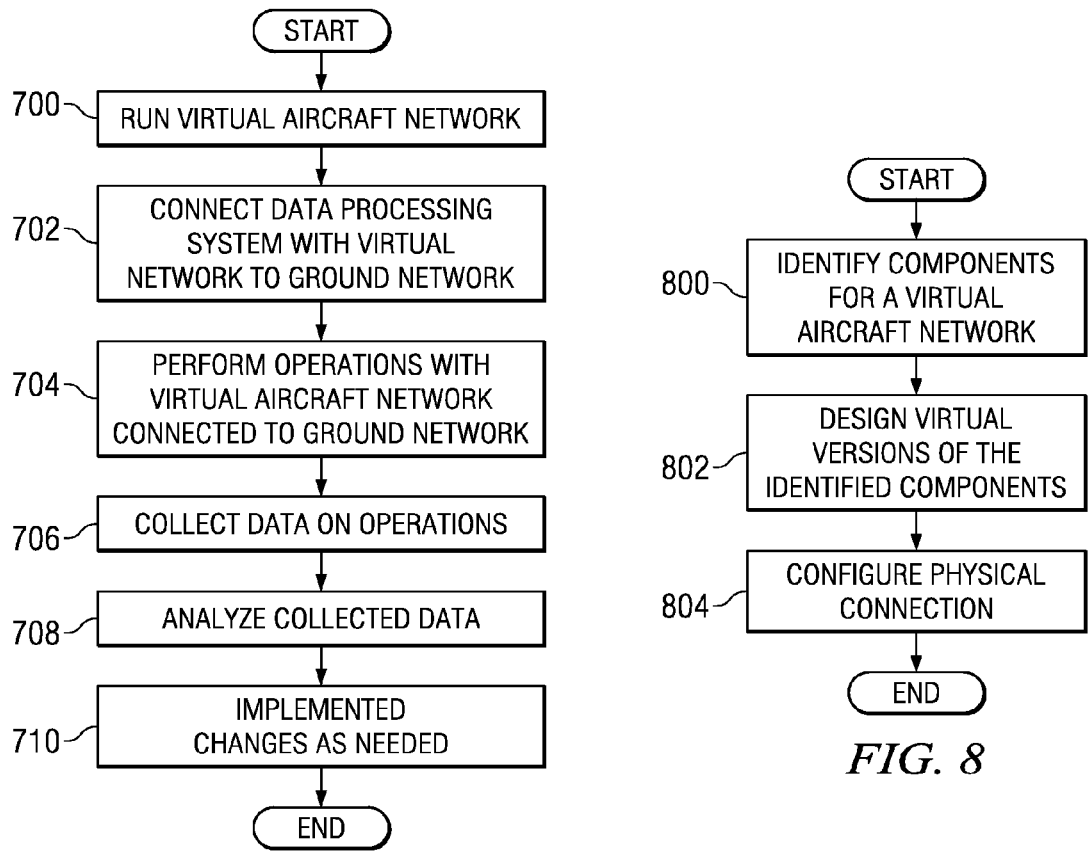
FIG. 7
FIG. 8

METHOD AND APPARATUS FOR SIMULATING AIRCRAFT DATA PROCESSING SYSTEMS

This application claims the benefit of U.S. Provisional Application No. 60/984,131, filed Oct 31, 2007.

BACKGROUND INFORMATION

1. Field

The present disclosure relates generally to an improved data processing system and in particular to a method and apparatus for processing data. Still more particularly, the present disclosure relates to a computer implemented method, apparatus, and computer usable program product for simulating a network, the attached computer systems, and the applications on those systems in a fully integrated system simulation.

2. Background

Modern aircraft are extremely complex. For example, an aircraft may have many types of electronic systems on board. A particular electronic system on an aircraft may also be referred to as a line replaceable unit (LRU). Each line replaceable unit may further take on various forms. A line replaceable unit may be, for example, without limitation, a flight management system, an autopilot, an in flight entertainment system, a communications system, a navigation system, a flight controller, a flight recorder, and a collision avoidance system.

Line replaceable units such as these may use software or programming to provide the logic or control for various operations and functions. The software used in these line replaceable units may also commonly be treated as aircraft parts in the airline industry. In particular, a software application for use in a line replaceable unit on an aircraft may be tracked separately and referred to as a loadable software aircraft part (LSAP) or a software aircraft part.

These different systems on the aircraft are part of an aircraft network. Maintenance for components within an aircraft network is performed at an airport or other suitable maintenance facility. This maintenance may include, for example, performing diagnostics, sending software aircraft parts to the aircraft, and downloading downlink data. This maintenance also may include, for example, updating or reloading software for the line replaceable units.

Currently, airlines manage the handling and maintenance of software on aircraft in a manner that is cumbersome and time consuming. Software aircraft parts are stored on physical media, such as diskettes, compact discs, flash memories, or digital versatile discs. An airline receives a delivery of the physical media and stores that physical media in a location, such as, for example, a filing cabinet.

Maintenance operations with currently used systems involve locating the media containing software aircraft parts and transporting that media to the aircraft. This type of storage and retrieval process takes up space and time. Further, data may be retrieved from aircraft to perform maintenance operations.

Therefore, it would be advantageous to have a method and apparatus for overcoming or minimizing the problems discussed above as well as other system integration problems.

SUMMARY

The different advantageous embodiments provide a method, apparatus, and computer program product for simulating mobile platforms. In one advantageous embodiment, a method is used to performing operations with a virtual aircraft network. A data processing system with the virtual aircraft network is connected to a ground network. The operations are performed with the virtual aircraft network connected to the ground network.

In another advantageous embodiment, a method is used for simulating a mobile platform. A plurality of components for a virtual network for the mobile platform is identified to form a plurality of identified components. A set of virtual versions of components are designed for at least a portion of the plurality of identified components. The set of virtual versions of components are placed on a data processing system. A set of physical network connections on the data processing system are configured.

In yet another advantageous embodiment, an apparatus comprises a virtual aircraft network and a data processing system. The virtual aircraft network is capable of simulating operations executed by a physical aircraft network. The data processing system is capable of communicating with a ground network, wherein the virtual aircraft network is located on the data processing system.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 6 is a diagram illustrating components used to simulate a network in accordance with an advantageous embodiment;

FIG. 7 is a flowchart of a process for testing a ground network with a virtual aircraft network in accordance with an advantageous embodiment; and FIG. 8 is a flowchart of a process for creating a virtual aircraft network in accordance with an advantageous embodiment.

DETAILED DESCRIPTION

Figure 1:
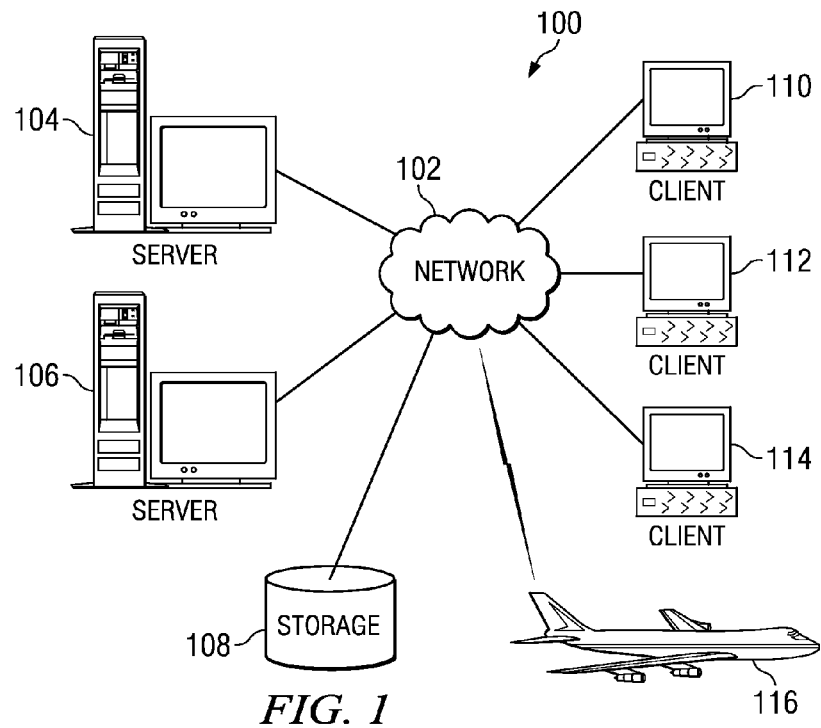
FIG. 1 is an exemplary diagram of a data processing environment in which advantageous embodiments may be implemented.

With reference now to the figures and in particular with reference to FIG. 1, an exemplary diagram of a data processing environment is provided in which advantageous embodiments may be implemented. As used herein, the term exemplary indicates an example and not necessarily an ideal. It should be appreciated that FIG. 1 is only exemplary and is not intended to assert or imply any limitation with regard to the environments in which different embodiments may be implemented. Many modifications to the depicted environments may be made.

FIG. 1 depicts a pictorial representation of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example.

Aircraft 116 also is a client that may exchange information with clients 110, 112, and 114. Aircraft 116 also may exchange information with servers 104 and 106. Aircraft 116 may exchange data with different computers through a wireless communications link while in-flight or any other type of communications link while on the ground. Network data processing system 100 may include additional servers, clients, and other devices not shown. Aircraft 116 also may include a network with computers and line replaceable units connected to the network.

In these examples, network 102 and the different data processing systems and devices connected to network 102 may be formed from a number of different networks. The different advantageous embodiments recognize that the current systems for performing maintenance operations on an aircraft containing a network of line replaceable units and other data processing systems is cumbersome and time consuming.

The different advantageous embodiments may implement a ground network that communicates with the aircraft network in which software aircraft parts may be stored within a library or storage system within the ground network. In this manner, storing actual physical media becomes unnecessary.

With a ground network, the aircraft network may communicate with the ground network in a number of different ways. For example, a wireless radio frequency communications link or a satellite communications link may be used between the ground network and the aircraft network. For example, server 104 and client 110 may be part of a ground network at one airport while server 106 is part of another ground network at a maintenance facility. Aircraft 116, in these examples, takes the form of a client, but is comprised of a network of line replaceable units and other computers.

The different advantageous embodiments provide a computer implemented method, apparatus, and program product for enabling a customer or user at a ground network to test connectivity and perform various operations with aircraft 116 in a manner that reduces the unavailability of aircraft 116 or other operations.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Figure 2:
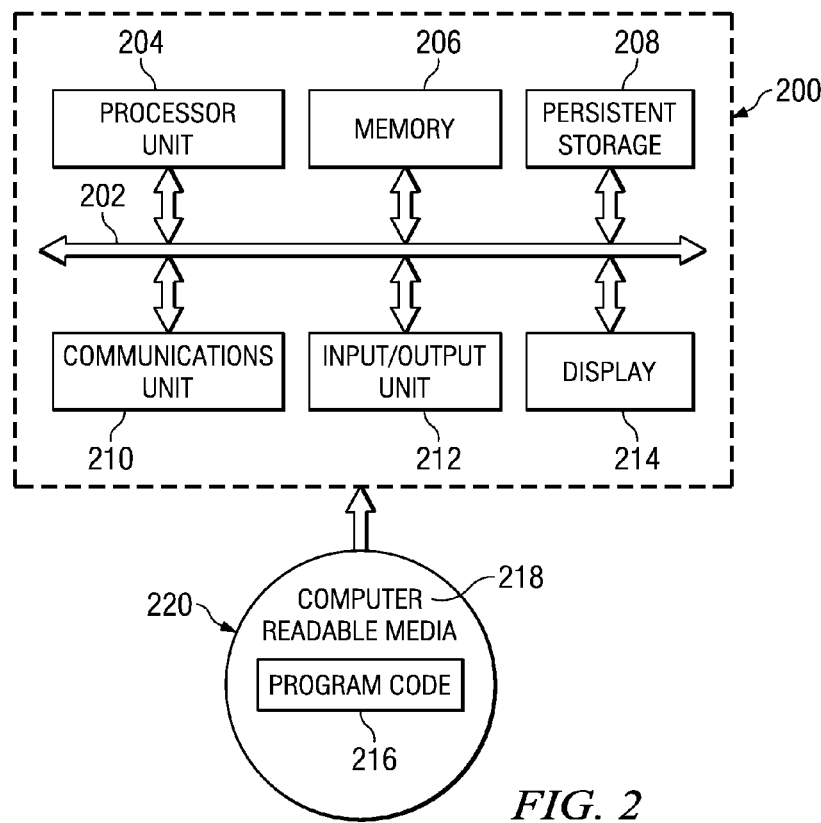
FIG. 2 is a diagram of a data processing system in accordance with an illustrative embodiment.

Turning now to FIG. 2, a diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. Computer program product may be selectively removable or may be permanently installed.

In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

With the use of ground networks, maintenance operations may be performed in a number of different ways. For example, a user may travel to the aircraft with a portable data processing system and perform the different operations. In other instances, the aircraft may communicate with a ground network located at an airport or other suitable maintenance facility.

In addition to using ground networks that communicate with aircraft networks, the different advantageous embodiments recognize that different types of aircraft have different configurations for their aircraft networks. Further, different airports have different configurations for their ground networks. As a result, a ground network for a particular airport may need to be reconfigured or adjusted to properly communicate with an aircraft network.

Performing these types of changes is time consuming when performed after receiving a new aircraft. Having to perform these adjustments may require having the aircraft present at the particular location to determine whether the ground network can communicate properly with the aircraft network for the new aircraft. Also, a customer may order multiple aircraft of a particular type.

Further, the manufacturer of the aircraft also may provide software for use in the ground network to perform various maintenance operations. This software often requires the customer to gain familiarly with the different tools and test processes and develop various regulatory compliance plans. These types of processes may be performed after the aircraft has been delivered. This type of process is costly because one of the new aircraft is required to perform the different operations.

As a result, this new aircraft is unavailable for revenue generation operations. Further, if the new aircraft is unable to effectively communicate with a ground network, use of any of the other new aircraft of the same type may be delayed until adjustments and modifications are made to the ground network.

Figure 3:
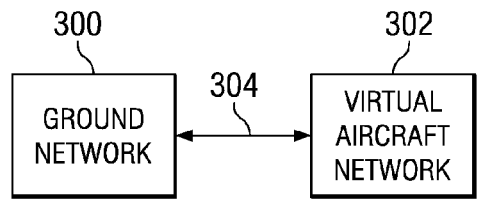
FIG. 3 is a diagram illustrating components used to perform operations with an aircraft network in accordance with an advantageous embodiment.

With reference now to FIG. 3, a diagram illustrating components used to perform operations with an aircraft network is depicted in accordance with an advantageous embodiment. In this example, ground network 300 and virtual aircraft network 302 are present. Ground network 300 may be, for example, a ground network located at an airport or other maintenance facility. Ground network 300 may be comprised of one or more networks and may be found within network data processing system 100 in FIG. 1. Virtual aircraft network 302, in this example, is a simulation or model of an aircraft network, such as one found on aircraft 116 in FIG. 1.

Virtual aircraft network 302, in these examples, may have one or more network interfaces that externally connect to various communications systems to allow virtual aircraft network 302 to communicate with ground network 300 through a communications links 304, which are a set of communications links. The set of communications links is one or more communications links that may take various forms, such as for example, wired, wireless radio frequency, and satellite communications links. These network interfaces may be, for example, wireless access points or other network devices. In these examples, communications links 304 may be, for example, wired or wireless. Wireless communications links within communications links 304 may be, for example, radio frequency or satellite links.

Virtual aircraft network 302 simulates different line replaceable units, software aircraft parts, and other components that may be present in an actual aircraft network for an aircraft. These other components may include, for example, a set of networks used to connect the different line replaceable units and other data processing systems that may be present within the aircraft network.

In this manner, users at ground network 300 may perform various operations to determine whether connectivity and operations can be successfully performed with virtual aircraft network 302. These different simulations may provide information to allow users to make adjustments to ground networks as needed to provide for proper communications links 304.

In addition to being able to establish communications links 304, these simulations allow for users to determine whether ground network 300 can properly exchange information with virtual aircraft network 302. This exchange of information includes, for example, sending commands, software aircraft parts, and other information to virtual aircraft network 302.

Additionally, the transferred information may also include receiving downlink data and status information from line replaceable units. The downlink data may be, for example, data generated during the operation of different line replaceable units. This downlink data also may be, for example, a log of events and data from a flight recorder. The status information may include the status of software aircraft parts to virtual aircraft network 302.

Further, users or operators of ground network 300 may be able to gain familiarity with tools used to perform various operations with virtual aircraft network 302. Also, this type of environment also allows users to test processes before actually receiving a first aircraft containing virtual aircraft network 302. In this manner, a new aircraft may be put into use immediately rather than being tied up in testing to determine whether the aircraft is able to properly communicate with the ground network.

Each airport at each different location may have different configurations for their ground networks. Consequently, an aircraft network for a new aircraft may be able to communicate with one ground network at one airport but may be unable to communicate properly with another ground network at another airport location. As a result, when a new aircraft is introduced, an airline or other customer typically tests the new aircraft at the different locations to determine whether changes or adjustments are needed in the configurations of the ground networks at these different locations.

The user of virtual aircraft network 302 allows an airline or other customer to test the aircraft networks at different locations prior to actually receiving the aircraft. In one example, virtual aircraft network 302 may be housed within a van or mobile communications shelter that may be situated at a particular airport location in order to exercise, test, validate, or certify the airport location prior to receiving a suitably configured aircraft.

Of course, ground network 300 also may be simulated as a virtual ground network in addition to or in place of virtual aircraft network 302. In this manner, a customer or user may be able to identify modifications and changes without interrupting operations at the ground network. By simulating ground network 300 in addition to virtual aircraft network 302, these simulations may be used during development phases for new aircraft and new ground networks.

An additional feature provided by the different advantageous embodiments is a capability to add test equipment and/or other devices to virtual aircraft network 302. The different advantageous embodiments allow for the use of nonstandard devices, physical devices, and virtual devices. A nonstandard device is a device that is not allowed to be connected to an aircraft network because of a rule or regulation. These rules or regulations may be set by different entities, such as, for example, an aircraft manufacturer, a government entity, a safety organization, or some other suitable entity. A device may become a nonstandard device if the device is modified.

The different advantageous embodiments recognize that with an actual aircraft network, limitations may be present as to what devices can be connected to the aircraft network. These limitations may be set by government regulations, such as those promulgated by the Federal Aviation Agency. In other examples, the limitations may be set based on safety standards identified by an aircraft manufacturer or other entity.

These limitations are not present with virtual aircraft network 302. As a result, other devices may be attached to virtual aircraft network 302 and/or existing hardware may be modified in virtual aircraft network 302 for simulation purposes in the different advantageous embodiments. These additions may be virtual devices, such as a virtual computer or line replaceable unit. In other examples, these additional devices may be a physical line replaceable unit that is connected to virtual aircraft network 302.

In other words, the additional device may be at least one of a virtual device and a physical device. As used herein, the phrase "at least one of", when used with a list of items, means that different combinations one or more of the items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and ten of item C; four of item B and seven of item C; and other suitable combinations.

Unlike the Part 25 certified airplane computer systems/ (LRU's), emulation devices, probe-cards, and other debugging tools could be connected to virtual aircraft network 302, while it is connected to the network system. These tools provide information that is otherwise unattainable when troubleshooting microprocessor based systems. In many cases, the microprocessor is removed from the computer and replaced with an emulator. This feature allows for collection of information from internal registers, internal buffers and internal data busses that are not normally available. This information can provide significant insight into the dynamics of a network system and significantly reduce the time required to troubleshoot a system.

Figure 4:
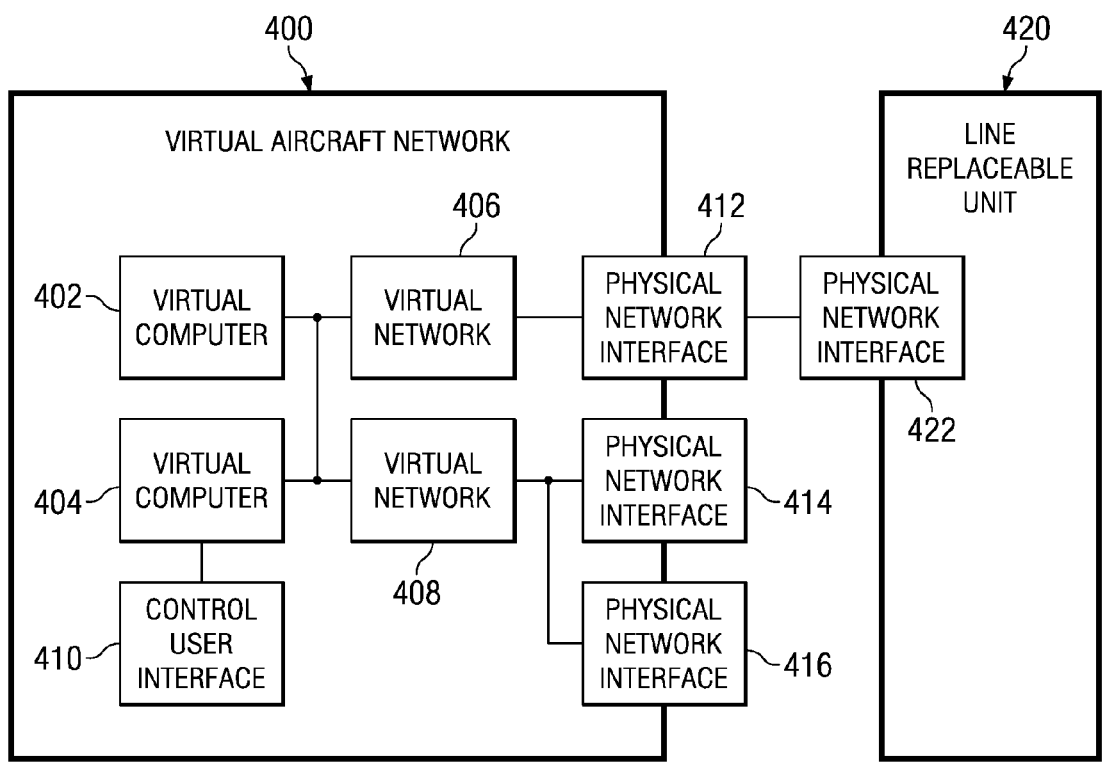
FIG. 4 is a diagram illustrating a virtual aircraft network in accordance with an advantageous embodiment.

With reference now to FIG. 4, a diagram illustrating a virtual aircraft network is depicted in accordance with an advantageous embodiment. In this example, virtual aircraft network 400 may be simulated or executed on a data processing system, such as data processing system 200 in FIG. 2. Virtual aircraft network 400 is an example of virtual aircraft network 302 in FIG. 3.

Virtual aircraft network 400 includes virtual computer 402, virtual computer 404, virtual network 406, virtual network 408, control user interface 410, physical network interface 412, physical network interface 414, and physical network interface 416. In these examples, physical network interface 412, physical network interface 414, and physical network interface 416 may be components located within the data processing system in which virtual aircraft network 400 executes.

Virtual computers 402 and 404 are simulations of computers, such as line replaceable units, that may be found in an aircraft network. Virtual network 408 simulates the network present within the aircraft network. Virtual network 408 may be a simulation of an open data network in an aircraft in which this network provides access to devices outside of the aircraft. Virtual network 408 may provide access to computers in the ground network and portable computers. Virtual network 406 may be, for example, an isolated data network in which access to this network is provided only for internal data processing systems, such as line replaceable units.

Control user interface 410 is a user interface that allows a user to set various parameters and control the simulation in virtual aircraft network 400. Physical network interface 414 and physical network interface 416, in these examples, provide a point at which a communications link may be established with another component, such as a ground network. Physical network interface 414 and physical network interface 416 may provide a simulation of communications links, such as satellite links or wireless links at a ground network.

Although many different components in an aircraft network may be simulated, in some cases, actual components from an aircraft network may be used in conjunction with virtual aircraft network 400. For example, line replaceable unit 420 may be connected to virtual aircraft network 400 through a communications link established between physical network interface 412 and virtual aircraft network 400, and physical network interface 422 and line replaceable unit 420.

Line replaceable unit 420, in this example, is used when a simulation or when the real functions of an actual component is not possible or feasible with respect to complexity, time, and/or expense. Although line replaceable unit 420 is not a virtual component, this component is considered part of virtual aircraft network 400, in these examples.

Virtual computer 402 and virtual computer 404 may execute actual software aircraft parts found in the line replaceable units that these virtual computers simulate. In other embodiments, these virtual computers may simulate various aspects of the software aircraft part that may not actually execute those parts. For example, if virtual aircraft network 400 is used to test the ability of a ground network to transfer data with virtual aircraft network 400, virtual computers 402 and 404 may include processes to simulate or perform the same actions in transferring data, but not include processes for generating the data.

Virtual computer 402 and virtual computer 404 may simulate various line replaceable units. These line replaceable units include, for example, a flight entertainment system, an autopilot, a flight management system, and a flight recorder. Additionally, virtual computer 402 and virtual computer 404 may be used to simulate other components within the aircraft network other than just line replaceable units. For example, virtual computer 402 may simulate a crew information system/management system.

Figure 5:
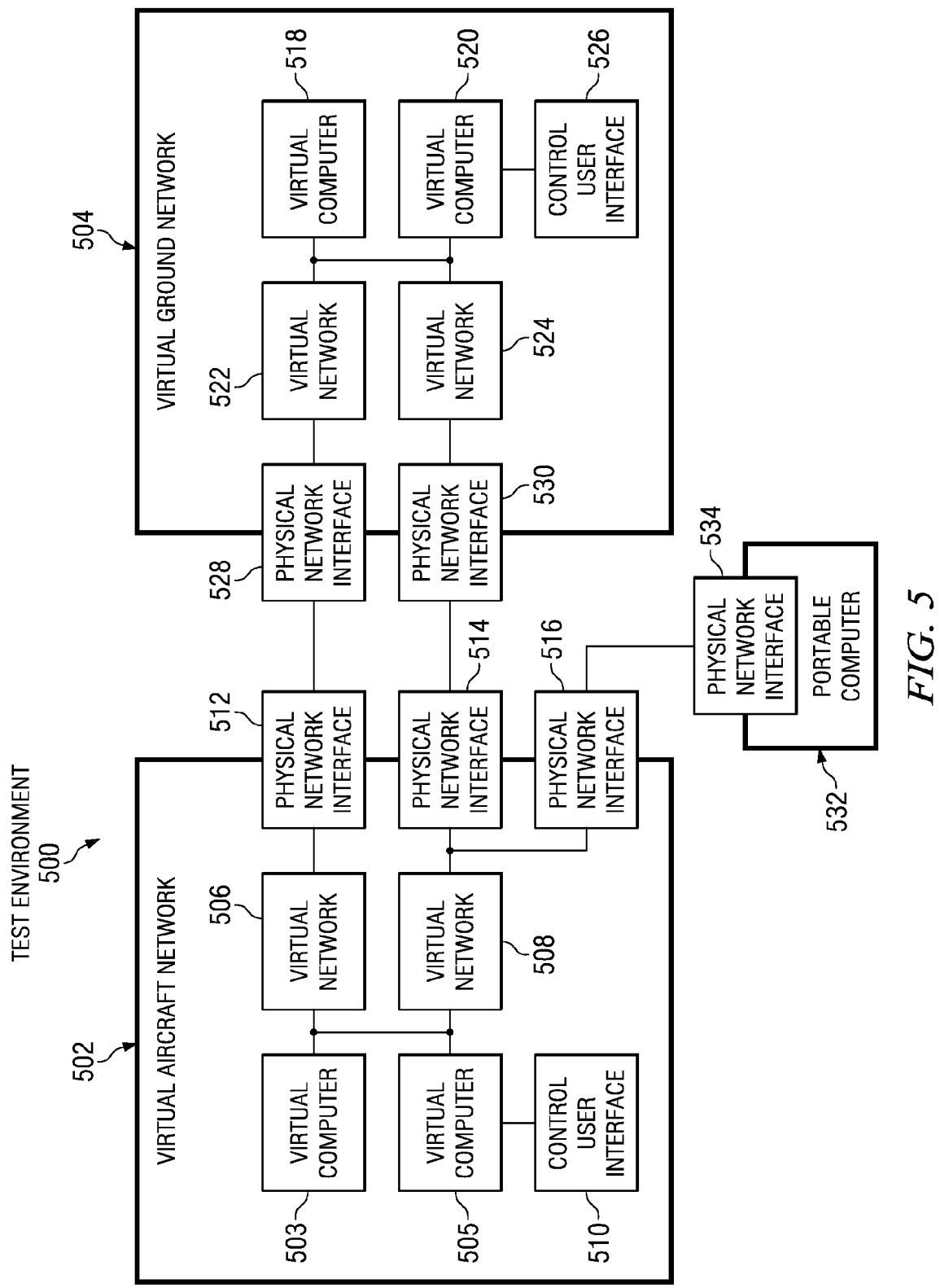
FIG. 5 is a diagram illustrating an example of a test environment in accordance with an advantageous embodiment.

Turning now to FIG. 5, a diagram illustrating an example of a test environment is depicted in accordance with an advantageous embodiment. In this example, test environment 500 includes virtual aircraft network 502 and virtual ground network 504. In this example, both virtual aircraft network 502 and virtual ground network 504 are simulated within a computer. Virtual aircraft network 502 and virtual ground network 504 may each be simulated in a data processing system, such as data processing system 200 in FIG. 2.

Virtual aircraft network 502, in this example, includes virtual computer 503, virtual computer 505, virtual network 506, virtual network 508, control user interface 510, physical network interface 512, physical network interface 514, and physical network interface 516. Virtual ground network 504 includes virtual computer 518, virtual computer 520, virtual network 522, virtual network 524, control user interface 526, physical network interface 528, and physical network interface 530. Additionally, test environment 500 also includes portable computer 532 which has physical network interface 534.

Physical network interface 512 is connected to physical network interface 528, and physical network interface 514 connects to physical network interface 530. These connections are configured to be connections that are present between an actual aircraft network and an actual ground network. These connections may be, for example, wireless or wired connections. Physical network interface 516 provides a connection to physical network interface 534.

Portable computer 532 may be a computer that is used to provide various maintenance operations in an aircraft. In other advantageous embodiments, portable computer 532 may be a virtual device that is simulated within ground network 504 in which this virtual device is capable of communicating with virtual aircraft network 502 as well as with other virtual components within virtual ground network 504. By using virtual network and virtual computers, a single airline laptop computer may be able to support several versions of maintenance laptop software for an aircraft type, such as a Boeing 787, as well as the potential to support multiple versions of several different aircraft types, such as a Boeing 787, a Boeing 747-800, a Boeing 777-200ER, and a Boeing 737-800

In this example, test environment 500 provides a simulation of an entire system, such as an aircraft connected to a ground network at an airport. The physical network interfaces, in these examples, allow the simulation of a particular network to communicate with actual physical data processing systems.

The different configurations illustrated in FIGS. 4 and 5 for the virtual aircraft networks and the virtual ground networks are presented for purposes of illustrating one embodiment. These illustrations are not meant to limit the manner in which different networks may be designed or implemented. For example, virtual aircraft network 400 in FIG. 4 illustrates two virtual computers and two virtual networks. Other numbers of virtual computers and virtual networks may be used, depending on the particular implementation. For example, virtual aircraft network 400 in FIG. 4 may employ ten virtual computers and two virtual networks, or in other examples, seven virtual computers and one virtual network.

Turning now to FIG. 6, a diagram illustrating components used to simulate a network is depicted in accordance with an advantageous embodiment. In this example, virtual environment 600 depicts components that may be used to simulate a network, such as, for example, virtual aircraft network 502 and virtual ground network 504 in FIG. 5.

Virtual environment 600, in this example, includes base operating system 602, virtual machine server 604, control base 606, virtual network 608, virtual machine 610, virtual machine 612, virtual machine 614, and control specific 616. The different components within virtual environment 600 may execute on a data processing system, such as data processing system 200 in FIG. 2.

Base operating system 602 is an operating system located on the data processing system. Base operating system 602 may be implemented using any available operating system. For example, a Windows® operating system or a Linux® operating system may be used. A Windows® operating system may be selected from one produced by Microsoft® Corporation of Palo Alto, Calif., USA.

Virtual machine server 604 is a process that is used to host virtual computers, such as virtual machines 610, 612, and 614. Additionally, virtual machine server 604 also allows the hosting of virtual network 608. Virtual machine server 604 allows a user to select and configure different components within virtual environment 600. Virtual machine server 604 may be implemented using different types of servers. For example, VMware server may be used VMware server is a product available from VMware, Inc.

Virtual machine 610, virtual machine 612, virtual machine 614, and virtual network 608 are components that are simulated for the particular virtual network. Control base 606 is a user interface for the simulation and provides an interface, such as control user interface 510 or control user interface 526 in FIG. 5. Control base 606, in one embodiment, may be a set of web pages that allows a user to start and stop a simulation as well as select various configurations. Further, control base 606 also may allow a user to restore or revert the simulation to a prior state or actually enter specific parameters.

Control specific 616, in this example, provides a user interface that may be part of a control user interface, such as control user interface 510 or control user interface 526 in FIG. 5. Control specific 616 provides user interfaces for a particular configuration. This interface may vary, depending on the particular simulation, such as an aircraft network or a ground network.

The different components illustrated in FIG. 6 are provided for purposes of depicting one manner in which a virtual network may be implemented. Of course, the depiction of the different components is not meant to limit the manner in which other advantageous embodiments may be implemented.

Turning now to FIG. 7, a flowchart of a process for testing a ground network with a virtual aircraft network is depicted in accordance with an advantageous embodiment. The process begins by running the virtual aircraft network (operation 700). This operation involves executing the simulation for the aircraft network. Thereafter, the data processing system with the virtual network is connected to the ground network (operation 702). This operation may involve establishing the various communications links used by the actual aircraft network to communicate with the ground network.

Next, the process performs operations with the virtual aircraft network connected to the ground network (operation 704). These operations may include, for example, various processes to assess whether the ground network can properly communicate with the aircraft network. Further, these operations may be performed by users to become familiar with the operation of software on the ground network used to perform operations with the aircraft network.

Data is collected from the operations performed (operation 706). The collected data is analyzed (operation 708). Changes are implemented as needed (operation 710). These changes may include, for example, adding or reconfiguring various components within the ground network to provide for proper operability with the aircraft network. The process terminates thereafter.

With reference now to FIG. 8, a flowchart of a process for creating a virtual aircraft network is depicted in accordance with an advantageous embodiment. The process begins by identifying components for a virtual aircraft network (operation 800). These components include, for example, different data processing systems, such as computers and line replaceable units on the aircraft. The components also include the various networks used to inner connect the different computers and line replaceable units. These components also include the physical adapters present in the aircraft network that provide for communication with a ground network.

Next, the process designs virtual versions of the identified components (operation 802). In operation 802, the designing may include created code for a program to simulate the input and outputs that occur in the identified component. For example, a virtual network may be, for example, program code that simulates the routing of data from one component to another component attached to the virtual network.

In some cases, an actual line replaceable unit or physical device may be used instead of a virtual component. This type of selection may depend on factors, such as time, complexity, and cost. The process then configures the physical connections for the virtual aircraft network (operation 804). Operation 804 may include installing the appropriate network adapters to provide the same types of connections available in the aircraft network. The process terminates thereafter.

In this manner, ground networks are able to perform communications with simulated aircraft networks to allow a checkout or review of airline and airport ground infrastructures present in the ground network and their ability to support the particular aircraft. Further, the different advantageous embodiments also allow customers or purchasers of aircraft to test systems from end to end prior to delivery of the first aircraft.

In different examples, the components used are actual software aircraft parts when possible. These different advantageous embodiments also allow for testing validation of ground to aircraft interfaces. Further, testing validation of the aircraft in the customer's environment also is enabled.

The different advantageous embodiments can take the form of an entirely hardware embodiment, an entirely software embodiment or an embodiment containing both hardware and software elements. Some embodiments are implemented in software, which includes but is not limited to forms, such as, for example, firmware, resident software, and microcode.

In this manner different components in an environment, such as an aircraft network and/or a ground network can be simulated. These virtual components can be connected to physical components to perform various operations, such as, for example, testing and training.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a fixed or selectively removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. For example, the different embodiments are any mobile platform with networked systems onboard and any large scale control system with networked elements such as a power grid or petrochemical supervisory control and data acquisition systems.

As some additional non-limiting examples, the different advantageous embodiments may be applied to networks, such as a network in an automobile, a network in a tank, a network in a ship, a network in spacecraft, a network in a submarine, and a network in missile.

As another example, different maintenance devices also may be simulated as part of a ground network. These maintenance devices may be ones used by aircraft mechanics to work with an aircraft network or a ground network.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for simulating a mobile platform, the method comprising:
    identifying a plurality of components for a network for the mobile platform to form a plurality of identified components;
    designing a set of virtual versions of components for at least a portion of the plurality of identified components;
    placing the set of virtual versions of components on a data processing system to form a virtual network for the mobile platform; and
    configuring a set of physical network connections on the data processing system.

2. The method of claim 1 further comprising:
    connecting the set of physical network connections to another network, wherein the virtual network is connected to the another network; and
    performing operations with the virtual network and the another network.

3. The method of claim 2 further comprising:
    collecting data from performing the operations to form collected data; and
    changing the other network in response to the collected data.

4. The method of claim 2, wherein the performing step comprises:
    performing operations with the virtual network and the another network to train a set of users on how to perform the operations.

5. The method of claim 4, wherein the virtual network is a virtual aircraft network and the another network is a ground network.

6. The method of claim 2 further comprising:
    utilizing a physical component of one of the plurality of components.

7. The method of claim 6, wherein the physical component is a line replaceable unit.

8. The method of claim 1, wherein the network is selected from one of a network in an aircraft, a network in an automobile, a network in a tank, a network in a ship, a network in spacecraft, a network in a submarine, and a network in missile.

9. The method of claim 1, wherein a selected component in the plurality of components is a software aircraft part in a line replaceable unit.

10. The method of claim 9, wherein the designing step comprises:
    designing a virtual machine for the line replaceable unit to execute the software aircraft part.

11. The method of claim 9, wherein the designing step comprises:
    designing a virtual machine for the line replaceable unit with a software component capable of simulating inputs and outputs to the software aircraft part.

12. A computer program product for simulating a mobile platform, the computer program product comprising:
    a non-transitory computer readable medium; and
    program code, stored on the non-transitory computer readable medium, for:
        identifying a plurality of components for a network for the mobile platform to form a plurality of identified components;
        designing a set of virtual versions of components for at least a portion of the plurality of identified components;
        placing the set of virtual versions of components on a data processing system to form a virtual network for the mobile platform; and
        configuring a set of physical network connections on the data processing system.

13. The computer program product of claim 12 further comprising:
    program code, stored on the non-transitory computer readable medium, for:
        connecting the set of physical network connections to another network, wherein the virtual network is connected to the another network; and
        performing operations with the virtual network and the another network.

14. The computer program product of claim 13 further comprising:
    program code, stored on the non-transitory computer readable medium, for:
        collecting data from performing the operations to form collected data; and
        changing the other network in response to the collected data.

15. The computer program product of claim 13, wherein the virtual network is a virtual aircraft network and the another network is a ground network.

16. The computer program product of claim 12, wherein a selected component in the plurality of components is a software aircraft part in a line replaceable unit.

17. An apparatus for simulating a mobile platform, the apparatus comprising a data processing system configured to:
    identify a plurality of components for a network for the mobile platform to form a plurality of identified components;
    design a set of virtual versions of components for at least a portion of the plurality of identified components;
    place the set of virtual versions of components on the data processing system to form a virtual network for the mobile platform; and
    configure a set of physical network connections on the data processing system.

18. The apparatus of claim 17, wherein the data processing system is configured to:
- connect the set of physical network connections to another network, wherein the virtual network is connected to the another network; and
- perform operations with the virtual network and the another network.

19. The apparatus of claim 18, wherein the data processing system is configured to:
- collect data from performing the operations to form collected data; and
- change the other network in response to the collected data.

20. The apparatus of claim 18, wherein the virtual network is a virtual aircraft network and the another network is a ground network.

21. The apparatus of claim 17, wherein a selected component in the plurality of components is a software aircraft part in a line replaceable unit.

\* \* \* \* \*